Figure 1:
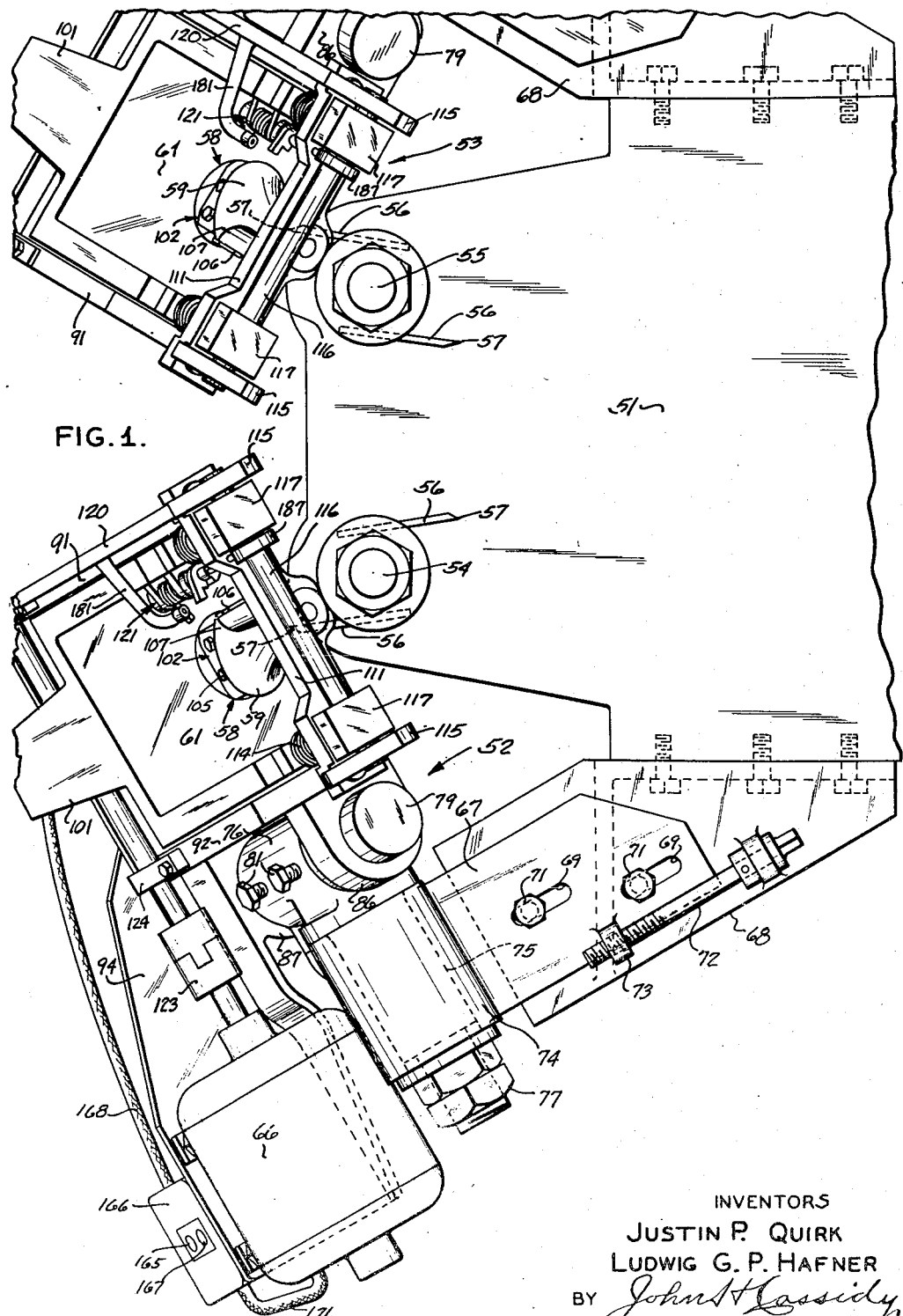

Nov. 15, 1949   J. P. QUIRK ET AL   2,488,100
SHOE HEEL TURNING MACHINE
Filed Feb. 14, 1947   11 Sheets-Sheet 3

INVENTORS
JUSTIN P. QUIRK
LUDWIG G. P. HAFNER
BY John H. Cassidy
ATTORNEY

INVENTORS
JUSTIN P. QUIRK
LUDWIG G. P. HAFNER
BY John H Cassidy
ATTORNEY

Nov. 15, 1949     J. P. QUIRK ET AL     2,488,100
SHOE HEEL TURNING MACHINE
Filed Feb. 14, 1947     11 Sheets-Sheet 5

INVENTORS
JUSTIN P. QUIRK
LUDWIG G. P. HAFNER
BY John H. Cassidy
ATTORNEY

Nov. 15, 1949  J. P. QUIRK ET AL  2,488,100
SHOE HEEL TURNING MACHINE
Filed Feb. 14, 1947  11 Sheets-Sheet 6
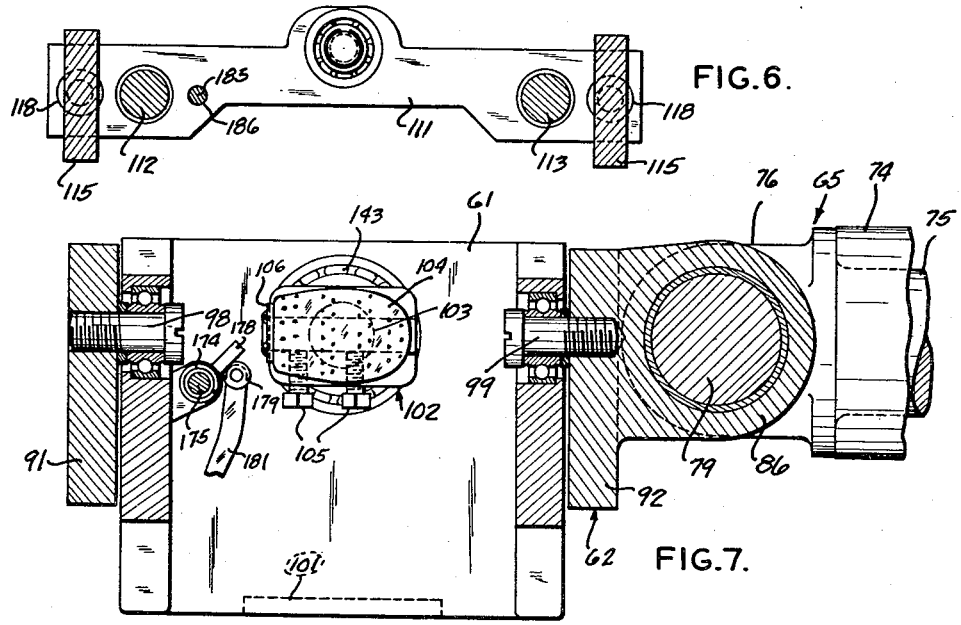
FIG. 6.
FIG. 7.
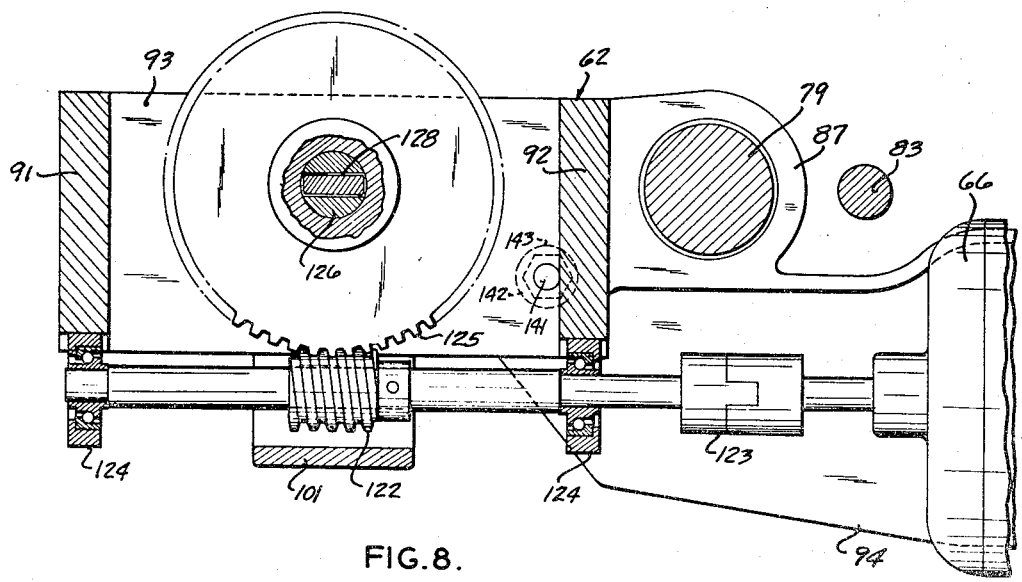
FIG. 8.
INVENTORS
JUSTIN P. QUIRK
LUDWIG G. P. HAFNER
BY John H Cassidy
ATTORNEY

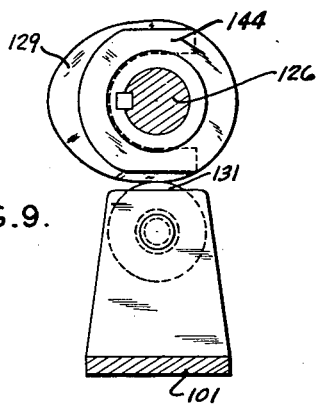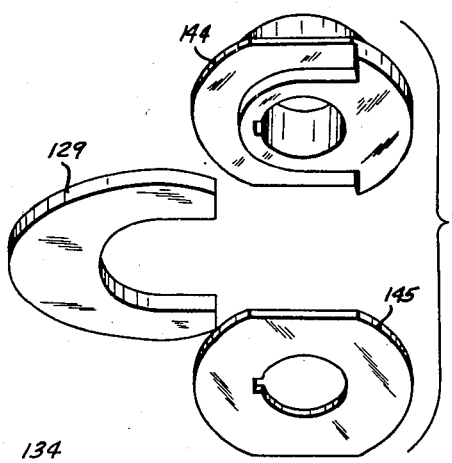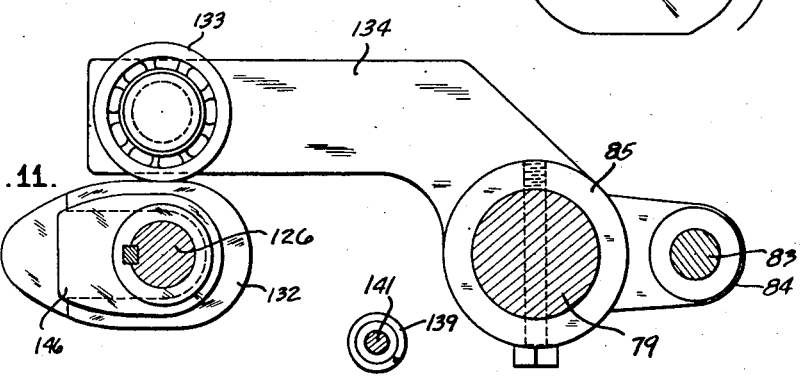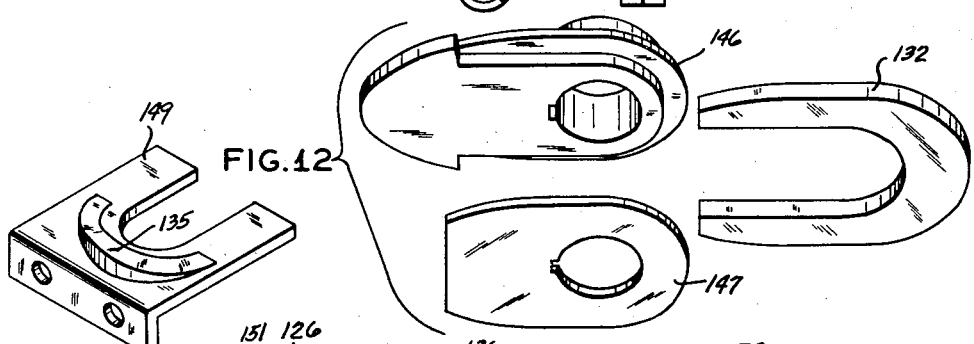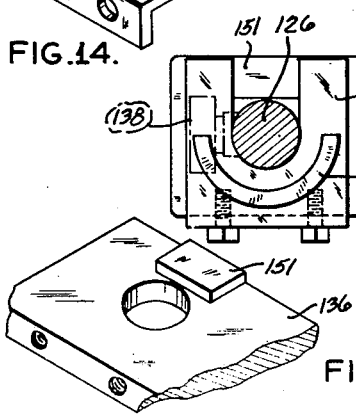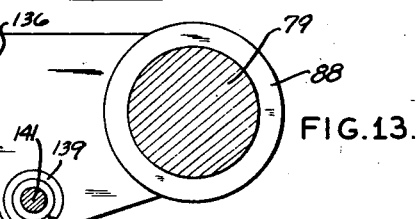
INVENTORS
JUSTIN P. QUIRK
LUDWIG G. P. HAFNER
BY *John H Cassidy*
ATTORNEY

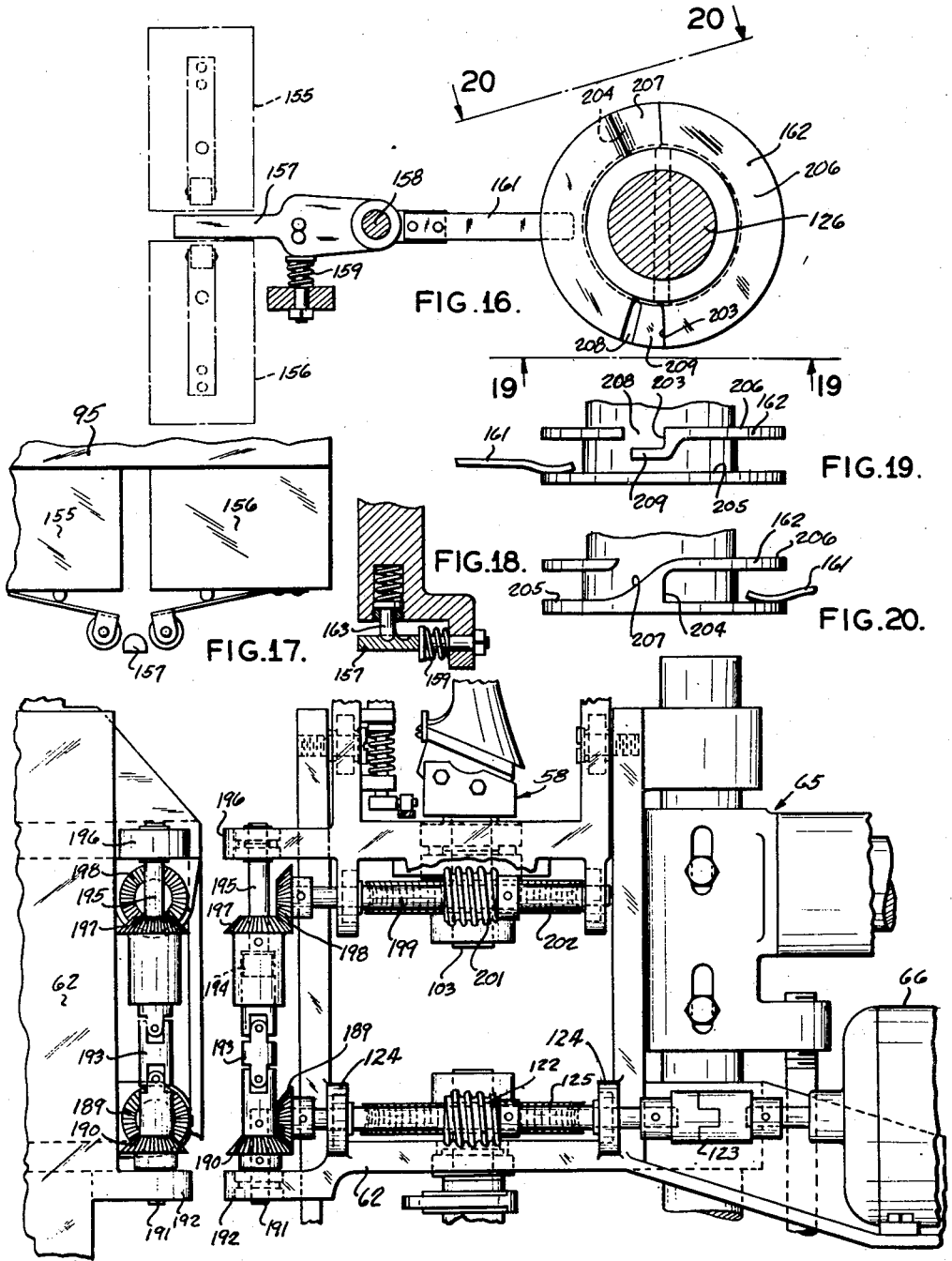

Nov. 15, 1949 J. P. QUIRK ET AL 2,488,100
SHOE HEEL TURNING MACHINE
Filed Feb. 14, 1947 11 Sheets-Sheet 10

INVENTORS
JUSTIN P. QUIRK
LUDWIG G. P. HAFNER
By John H. Cassidy
ATTORNEY

Patented Nov. 15, 1949

2,488,100

UNITED STATES PATENT OFFICE 2,488,100

SHOE HEEL TURNING MACHINE

Justin P. Quirk, St. Louis County, and Ludwig G. P. Hafner, St. Louis, Mo., assignors to United Wood Heel Company, St. Louis, Mo., a corporation of Delaware Application February 14, 1947, Serial No. 728,430

29 Claims. (Cl. 12—87)

This invention relates to shoe heel turning machines.

In the manufacture of wooden shoe heels, the heel is turned or cut in a machine from a heel blank, the breast of which has been formed by a previous cutting operation. Thus, in the heel turning machine, per se, the side and back surfaces only, are cut or turned and these operations are performed by moving the heel blank into the path of one or more high speed rotating cutters with a series of complicated movements which gives the heel its desired shape.

The prior art machines have taken several forms ranging from those in which the feeding is done manually to those in which this function is effected automatically. In all commercial instances, however, these machines shape the heel by making two cuts extending from the breast edges of the blank to the center of the back of the heel in order not to cut against the grain of the wood. This method of turning leaves a slight ridge at the back of the heel, known to the art as "back line," which must be removed by a subsequent sanding operation known as "scouring."

This latter method requires a second operation, either by highly skilled labor or by the use of a second machine in which the complex movements of the cutting or turning machine must be duplicated or substantially so, and the over-all operation greatly increases the unit cost of the finished article.

Accordingly, it is a general object of the instant invention to provide a shoe heel turning machine which will produce a heel without a back line, thus eliminating the costly scouring operation, one which will produce heels at greater speeds than with manual operation and one which is fully automatic with the exception of the loading operation.

Another object of the invention is to provide a machine of the type described with which a larger range of types and styles of heels may be manufactured.

It is also an object of the invention to provide a work holding and feeding unit for a shoe heel making machine that is capable of giving complex movements to a work piece and one which can be removed readily and replaced as a unit.

A further object of the invention is to provide such a machine having means for making adjustments thereto more easily, quickly and cheaply than heretofore, so as to facilitate changes from one style, size or height, to another.

Still another object of the invention is to provide a machine of the type described which is susceptible to the application of proper mechanism for loading and unloading the machine so that it can be operated entirely automatically without the constant attention of an operator.

Yet another object of the invention is to provide a machine of the type described in which relative motion of a heel blank with a cutter is effected by movement of the heel blank carriage unit or by both movement of this carriage and the cutter.

A still further object of the invention is to provide a heel turning machine having an improved ejector mechanism by means of which a finished heel is automatically discharged from the machine upon release of the heel from its clamping mechanism.

It is also a purpose of the invention to provide a machine of the character described capable of carrying out the foregoing objects of the invention, which is comparatively economical to build and operate, is positive and accurate in its operations, is easily maintained, is compact and sturdy in construction, and one that can produce a superior article at a minimum unit cost.

Figure 2:
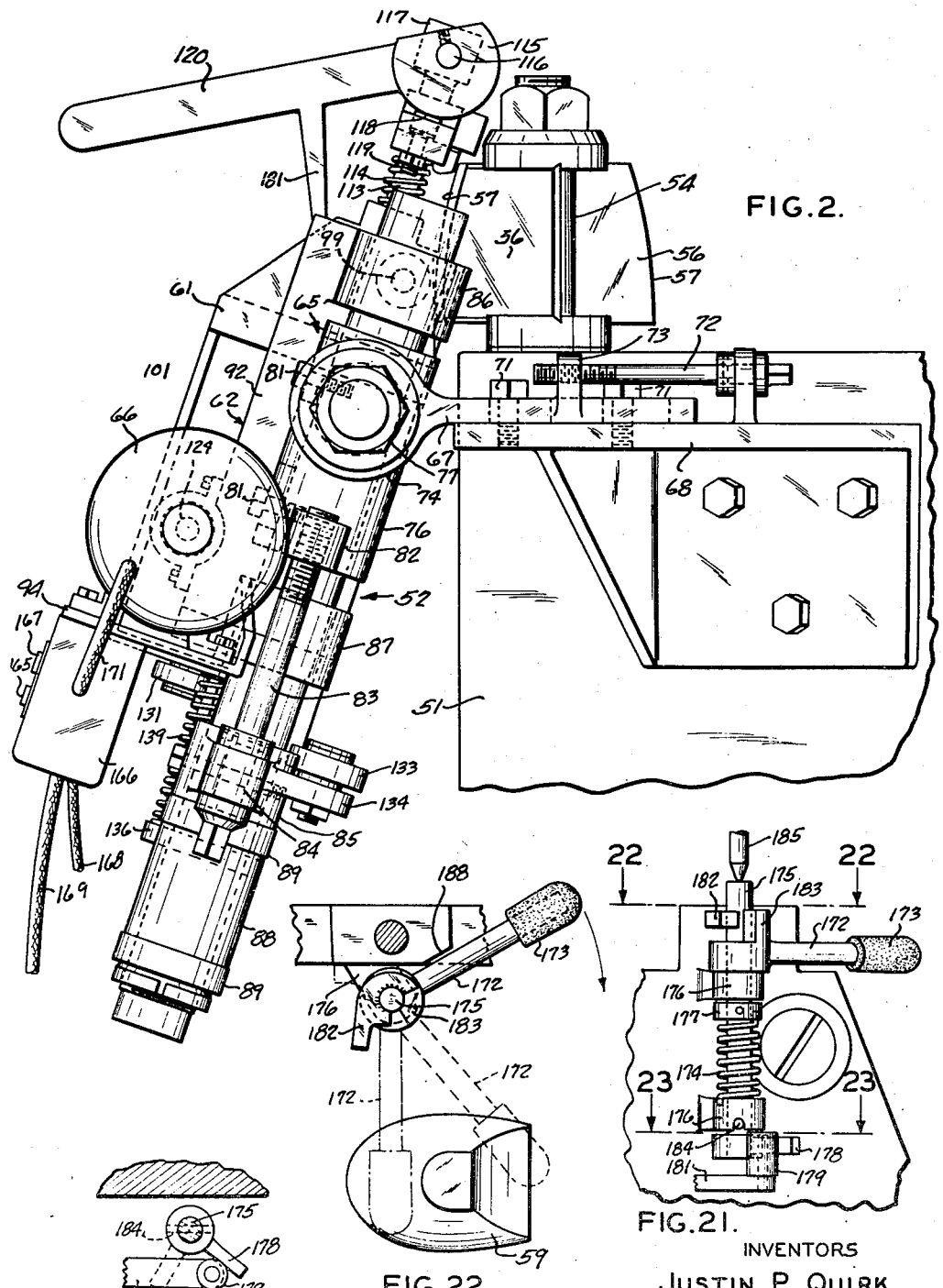
Figure 3:
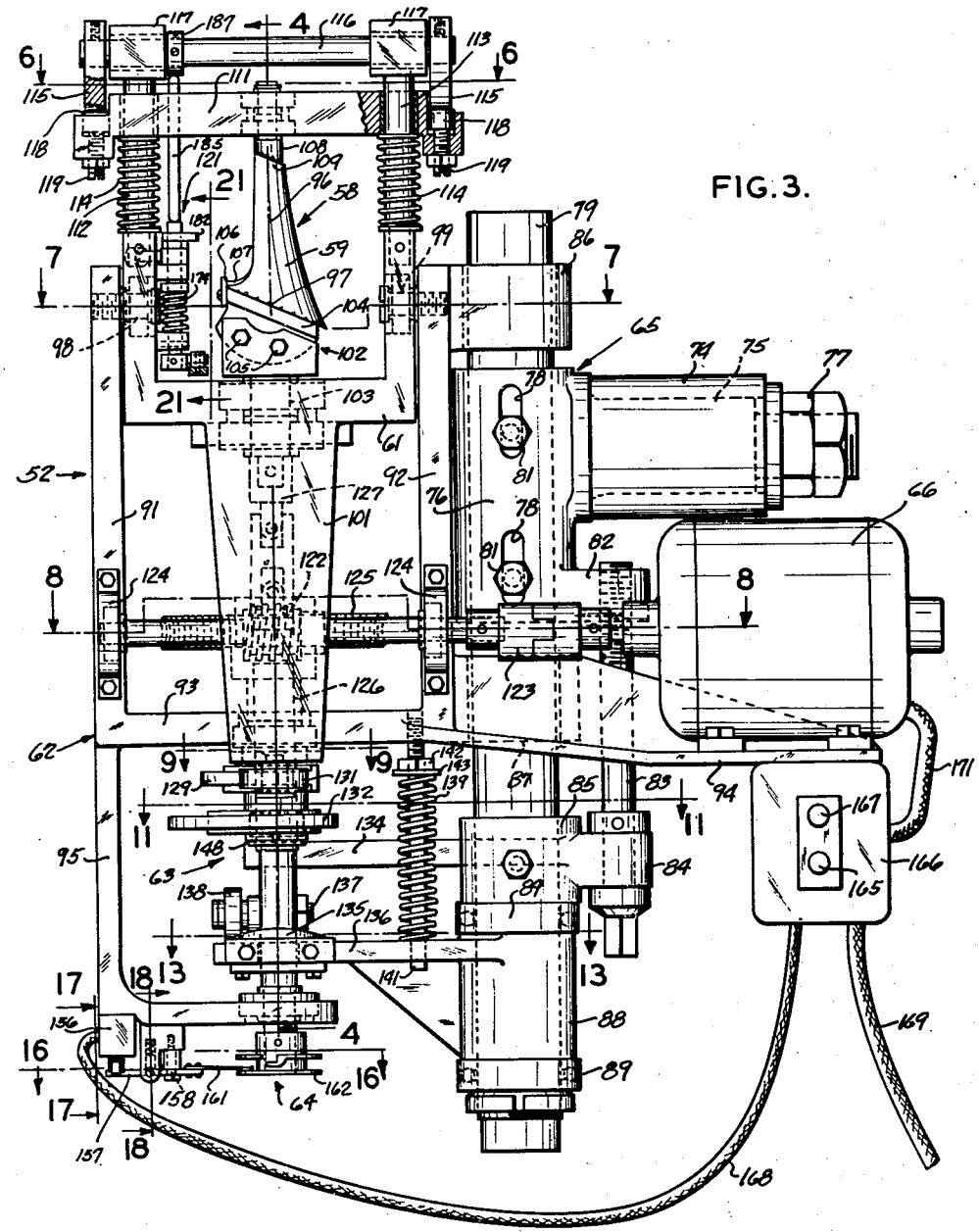
Figure 4:
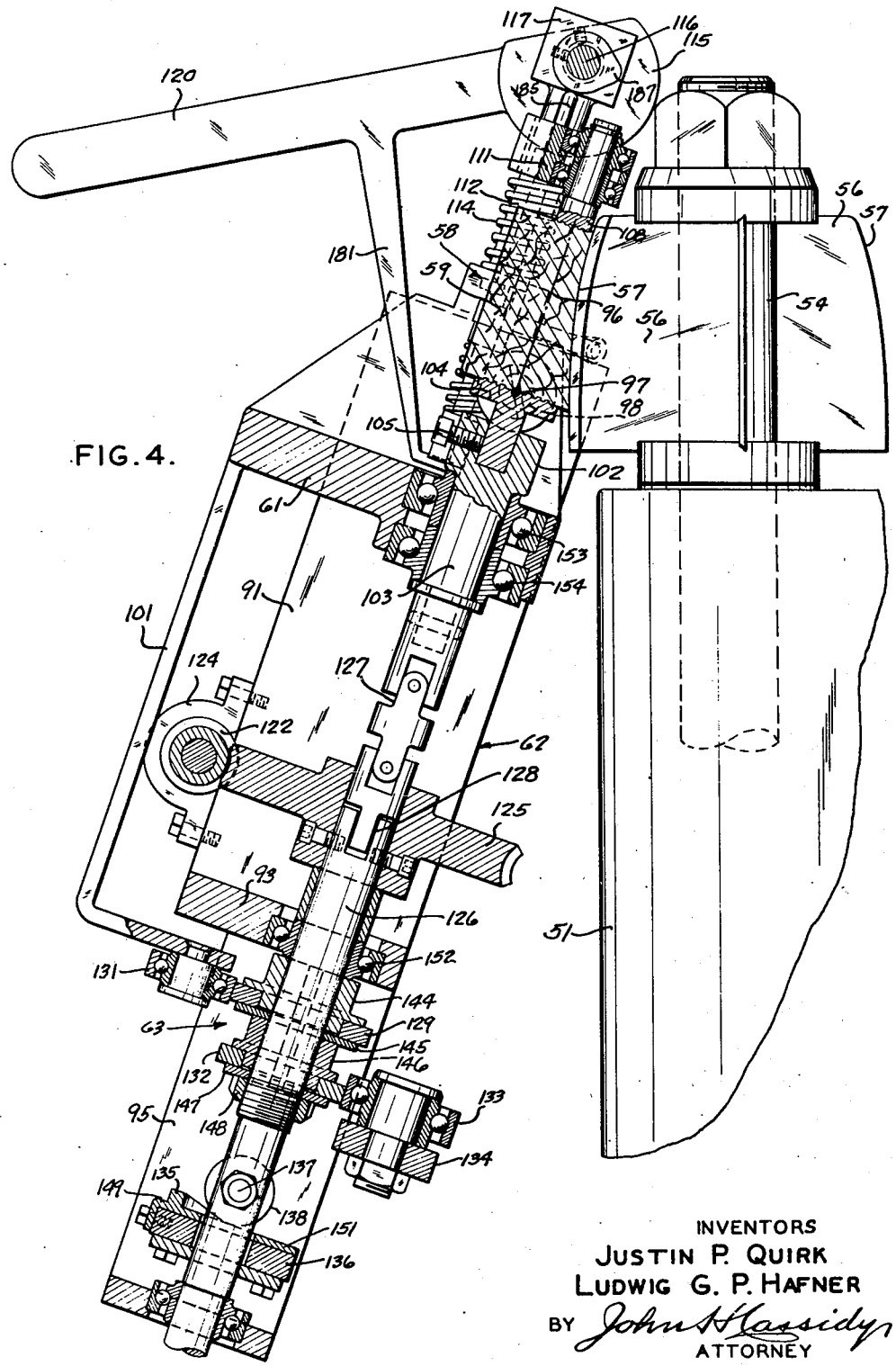
Figure 5:
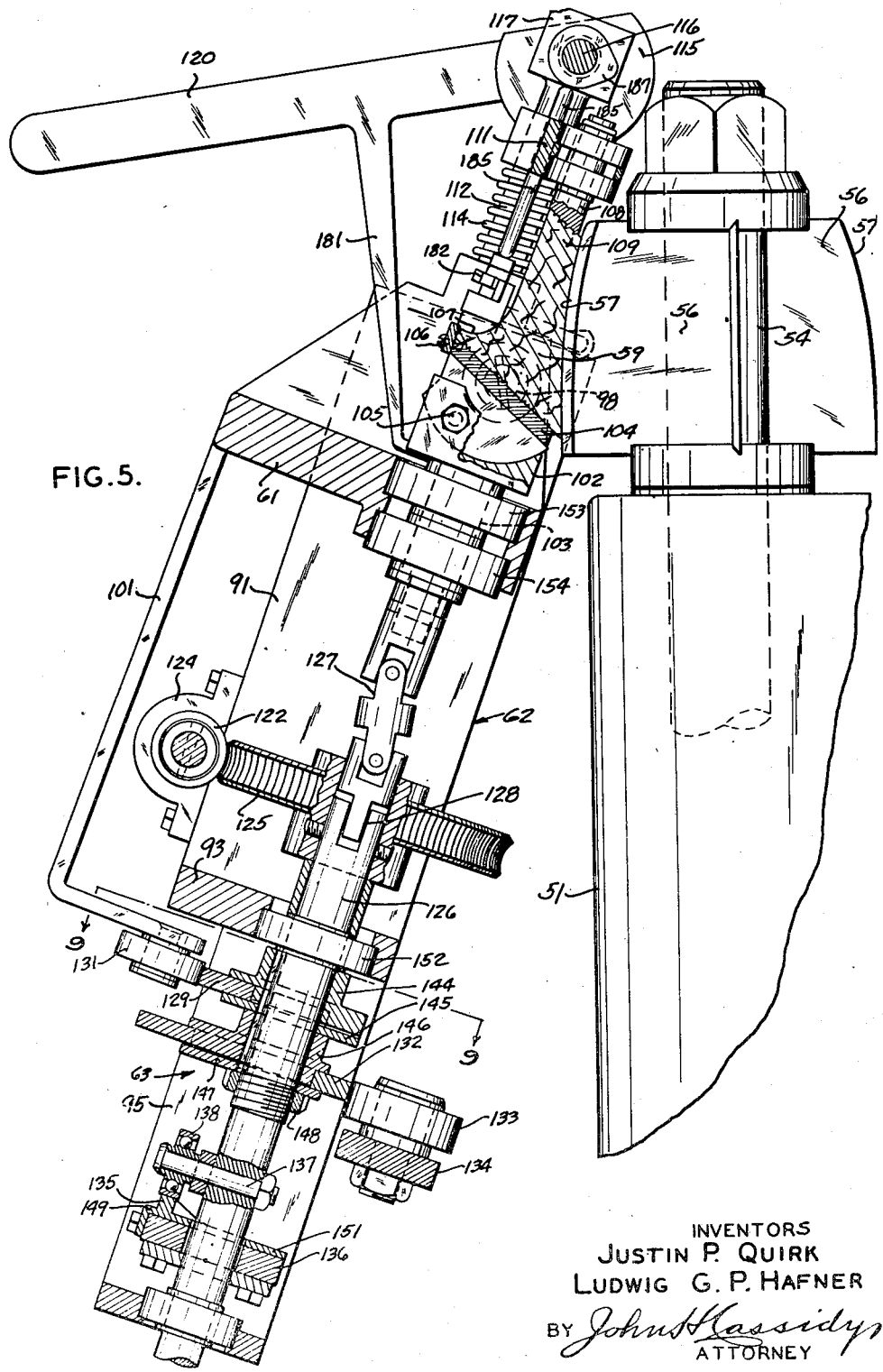

Other objects and advantages will become apparent as the description proceeds and a more comprehensive understanding of the invention will be afforded from the following detailed specification when considered in conjunction with the accompanying drawings, in which Fig. 1 is a fragmentary plan view of a shoe heel turning machine embodying the instant invention in one of its illustrated forms, Fig. 2 is a side elevational view of the machine illustrated in Fig. 1 showing one of its heel blank feeding units positioned with respect to one of the machine's cutters, Fig. 3 is a front elevational view of one of the machine's heel blank feeding units, Fig. 4 is a vertical sectional view, with parts removed, of the heel blank feeding unit illustrated in Fig. 3 taken along the line 4—4 indicated thereon, and showing the same with its cam and jack spindle shafts in aligned position, Fig. 5 is a view similar to that of Fig. 4, showing the unit with its cam and jack spindle shafts in off-set position, Fig. 6 is a cross sectional view of the unit illustrated in Fig. 3 taken along the line 6—6 indicated thereon and showing the mountings for the movable jaw of the unit's heel jack, Fig. 7 is a cross sectional view of the unit illustrated in Fig. 3 taken along the line 7—7 indicated thereon showing the adjustable seat of the unit's heel jack and the pivotal connections between its frame and cradle, Fig. 8 is a cross sectional view of the unit illustrated in Fig. 3 taken along the line 8—8 indicated thereon and showing the unit's power train, Fig. 9 is a cross sectional view of the unit's cam shaft taken along a line 9—9 on Figs. 3 and 5 showing a cam and cam follower employed to give tilting movement to the unit's heel cradle with respect to the machine's cutter, Fig. 10 is an exploded perspective view of the cam shown in Fig. 9, Fig. 11 is a cross sectional view of the unit's cam shaft taken along a line 11—11 on Fig. 3 showing a cam and cam follower employed to impart reciprocating movement to the unit with respect to the machine's cutter, Fig. 12 is an exploded perspective view of the cam illustrated in Fig. 11, Figs. 13, 14 and 15 are detail views of a cam employed to give vertical movement to the unit with respect to the axis of its cam and heel jack spindle shafts, Fig. 13 being taken along a line 13—13 on Fig. 3, Figs. 16, 17, 18, 19 and 20 are detail views of a control mechanism, including a pair of cam operated limit switches, for the unit's driving motor, taken from and along the lines 16—16, 17—17 and 18—18 indicated on Fig. 3 and from the lines 19—19 and 20—20 on Fig. 16, Figs. 21, 22 and 23 are detail views of an ejecting mechanism employed in the unit to remove finished heels therefrom, Fig. 21 being taken along a line 21—21 on Fig. 3, and Figs. 22 and 23 along the lines 22—22 and 23—23 indicated on Fig. 21, Figs. 24 and 24A are front and side elevational views of a power train for driving the unit's cam and heel jack spindle shafts, the same being a modification of that illustrated in Figs. 2, 3, 4 and 5, Figs. 25, 26, 27 and 28 are front, side, vertical sectional and cross sectional views, respectively, of a shoe heel turning machine illustrating the instant invention in a modified form, the latter two views being taken on the lines 27—27 and 28—28 of Fig. 25, and Figs. 29 to 33, inclusive, are schematic diagrams illustrating the relative positions of the unit's tilting, reciprocating and lift cams together with the unit's control mechanism cam for one complete turning cycle.

In the embodiment of the invention illustrated in Fig. 1 a shoe heel turning machine is provided which comprises essentially a cutter unit 51 and two heel blank feeding units 52 and 53.

The cutter unit 51 may take the form of any of the presently provided high speed rotating units. As presently used, this unit comprises means not shown for rotating two cutter spindles 54 and 55 at a high rate of speed in the order of about 8500 R. P. M. Each of these spindles have clamped thereto for rotation therewith a plurality of cutter blades 56. These blades are provided with a cutting surface 57 which is parabolic in shape and against which a heel blank is moved to perform the required cutting operation. Here also each of the cutter spindles are rotated as above described and each of the heel blank feeding units 52 and 53 are designed to move the heel blank against the cutter blades of their respective cutters with the complex movements heretofore referred to and later to be described.

Thinking of each of the heel blank feeding units 52 and 53, together with their respective cutting blades, as a separate and individual cutting machine, the two are employed as a dual unit for the purpose of reducing to a minimum lost time involved in loading and unloading the machine. In other words, the movements imparted to the heel blank feeding unit 52 are synchronized with those of the heel blank feeding unit 53 in a manner such that a heel blank is loaded in the former while the cutting operation is being performed in the latter. Thus, as the blank, which is placed in the unit 52, is being shaped in the unit, a finished heel is being ejected or otherwise removed from the unit 53 and the cutting operation is performed as a continuous function, one heel blank being placed in one of the units while another heel blank is being cut in the other unit.

Since the heel blank feeding units 52 and 53 are identical in form, only one will be described. As is well known in the art, the function of a heel blank feeding unit is to move the heel blank against the blades of a rapidly rotating cutter with a series of rather complicated movements which gives to the finished heel its desired shape and size. As will be pointed out later the relative movement of the heel blank with respect to the cutting blades may be effected by moving the blank against a stationary cutter or may be accomplished by moving both the heel blank and the rotating cutter blades relatively to each other.

In the present modification the cutter blades 56 of the cutter are rotated about the spindle 54, which is stationary, and all of the required relative movements of the heel blank with respect to the cutter are produced by the heel blank feeding unit. As will be developed later in greater detail, the movements imparted to the heel blank by the heel blank feeding unit 52, beside its rotational movement, are three in number. First, the rotating heel blank is moved reciprocatively into the path of the cutter blades. Secondly, the heel is displaced with lifting movement parallel to the longitudinal heel axis, and as a third movement the heel blank is tilted or rotated about a horizontal axis passing through the seat of the heel perpendicular to the longitudinal axis aforesaid.

The mechanisms which provide for all of the aforementioned movements are contained within the heel blank feeding unit now to be described. With reference to Fig. 3 the heel blank feeding unit 52 may be described broadly as comprising a jack 58 in which a heel blank 59 is clamped for movement against the cutter blades 56. A heel cradle 61, in which the jack 58 is mounted and by means of which the same is tilted, is supported in a frame 62, and the latter mounts a movement-imparting cam assembly 63 and a control mechanism 64. A frame mounting and adjusting means 65 and a power means 66, taking the form of an electric motor, also constitute parts of the unit and all of these elements are suitably arranged and are adjustably mounted upon the cutter unit 51.

As viewed in Fig. 2, the heel blank feeding unit 52 is mounted with respect to the cutter spindle 54 at approximately an angle of 21°. The entire unit 52 is secured to the machine 51 by a mounting bracket 67 which is bolted to a plate bracket 68 secured to a housing of the unit 51. The mounting bracket 67 has slots 69 (Fig. 1) cut therein through which are passed attaching bolts 71. Through this mode of attachment the entire unit 52 may be moved toward and away from its cutter as one of its several adjustments to be described in greater detail. A vernier movement of the unit, however, is effected by means of a bolt 72 whose threaded portion turns in a threaded lug 73 secured to the bracket 67, the said bolt being anchored to the plate bracket 68 as shown.

The mounting bracket 67 has a shaft-receiving section 74 (Fig. 3) in which a shaft section 75 of a shaft bracket 76 is rotatably secured. The shaft 75 is held against movement, other than that providing for a tilting adjustment, by a lock nut assembly 77. The shaft bracket 76 has a plurality of longitudinal slots 78 cut therein which provide for the longitudinal movement of a mounting shaft 79 supported therein, the said shaft being arranged to receive two bolts 81 with which it is rigidly secured within the shaft bracket 76.

Further, the shaft bracket 76 is provided with an extension 82 which receives a threaded bolt 83 passed through and operating against a lug 84 forming a part of a collar 85 also bolted to the shaft 79. In the latter instant the bolt 83 provides for the vernier adjustment of the shaft 79 longitudinally within the shaft bracket 76.

The frame 62 is secured to the mounting shaft 79 by two bearinged collars 86 and 87 and through this attaching means it is free to rotate about the shaft 79 and also to move longitudinally with respect thereto. Lying below the collar 85, which is rigidly attached to the shaft 79, is a lift cam bracket 88, which is bored to receive the shaft 79 and which pivots thereabout and rides against the thrust bearings 89.

Through the mounting mechanism just described the frame 62 of the heel blank feeding unit is free to rotate to and away from the cutter blades 56 about the rigidly mounted shaft 79 and also to move vertically along said shaft with respect to the longitudinal axis of the heel blank 59 which is secured in its jack 58. Furthermore, the position of the shaft 79 upon which the frame moves is subject to a tilting adjustment which is effected by moving the shaft 75 in the shaft-receiving section 74 of the mounting bracket 67. Also, the shaft 79 is subject to a vertical adjustment effected by moving the same in the shaft bracket 76 by means of the bolt 83 which adjustment is maintained by locking the shaft 79 in place in the bracket 76 by tightening the bolts 81.

It is to be noted that the frame 62 comprises two upright members 91 and 92 and a bottom member 93. Formed as a part of the lower frame member 93 is a motor mounting bracket 94, upon which the motor 66 is supported to move with the frame. Also, a lower extension 95 of the frame 62, is provided in which the movement-imparting cam assembly 63 is supported and to which the control mechanism 64 is attached.

As previously stated, in shaping the heel blank 59 into a finished heel a rotational movement is imparted thereto about a longitudinal axis 96 of the heel. Furthermore, a tilting movement is imparted to the heel about an axis 97 perpendicular to its longitudinal axis 96. To provide for the tilting movement is the function of the cradle 61. This cradle, which is substantially U-shaped, is mounted for movement on two trunnions 98 and 99 supported in the upright members 91 and 92 of the frame 62. Secured to the lower member of this cradle is a cam follower extension arm 101 which receives and transmits to the cradle 61 the forces which tilt it about the trunnions 98 and 99.

Supported within the cradle 61 is the jack 58 in which the heel blank 59 is removably clamped. This mechanism comprises an adjustable seat 102 which is secured to, and for rotation with, a jack spindle 103. The seat 102 has cradled therein an adjustable heel plate 104 which is slotted for arcuate movement about the attaching bolts 105. The plate 104, which has its upper surface serrated, also has secured thereto a gauge plate 106 against which a shelf 107 of the heel blank 59 is moved for accurate positionment of the latter in the jack. A movable jaw 108 is also provided as part of the jack 58 which has a serrated surface for engaging the top lift 109 of the heel blank. This jaw is mounted for rotation in a cross bar 111 which rides vertically on two standards 112 and 113 secured to the cradle 61. The cross bar 111 is moved downwardly against the action of two springs 114 by means of two cams 115 secured to a shaft 116 which is bearinged in two journals 117. The cam followers 118 against which the cams 115 act are adjustable by means of two screws 119, which adjustment provides means to accommodate different heights of heel blanks. Here the movable cross bar 111 is moved vertically on its standards by means of a jack operating handle 120 (Fig. 5) rigidly attached to the shaft 116.

In addition to the jack 58 the cradle 61 also carries a heel ejecting mechanism 121 which will be described later.

With further reference to the cradle 61, it is to be pointed out that for two positions of the jack 58, the axis 97 is coextensive with the axes of the trunnions 98 and 99, or the tilt axis of the cradle. In the illustrative example, maximum tilt is given the cradle when the axis 97 is in one of these positions. However, it is to be remembered that the jack 58 rotates the heel about its axis 96 and that the tilt axis of the cradle, which is normal to the axis 96, is fixed. Therefore, by causing the cradle 61 to tilt at selected times during the rotation of the jack, it is possible to tilt the heel about an infinite number of radial axes normal to its longitudinal axis.

Power is supplied to the heel blank feeding unit 52 by the motor 66 in order that the heel blank unit may be given its required complicated movements which account for the shape of the finished heel. This motor is directly connected to a shaft, mounting a worm 122, through a coupling 123 attached to the motor and worm shafts. The worm gear shaft is journalled in the bearings 124 secured to the frame 62, and the worm 122 engages and meshes with a worm gear 125 which is splined to a cam shaft 126. The jack spindle 103 is connected with the cam shaft 126 to rotate therewith through a double universal joint 127 and a slip joint 128 (Fig. 4). Through this arrangement of the parts, it is possible for the cradle 61 to be tilted about its trunnions 98 and 99, thereby giving a tilting motion to the heel blank, and at the same time the jack spindle 103 may be driven to rotate the jack 58 and the heel blank 59 about an axis coincident with the axis 96.

The pivotal movement of the unit frame 62 about the shaft 79 and longitudinally thereof, together with the tilting movement imparted to the cradle 61, is effected by the movement imparting cam assembly 63 previously mentioned. This mechanism comprises a series of cams and cam followers which are arranged to give the component parts of the unit assembly their required movements. Generally speaking, this mechanism comprises in part the cam shaft 126 which is coaxial with the jack spindle 103 and the longitudinal axis 96 of the heel blank 59 when the cradle 61 is not in its tilted position. The cam shaft 126 has fixed thereto a tilting cam 129 against which a cam roller 131, secured to the cam follower extension arm 101, operates. As the tilting cam 129 rotates with the shaft 126 a portion thereof moves against the cam follower 131 and rotates the cradle 61 about the trunnions 98 and 99 to impart a tilting motion to the heel blank 59.

Movement of the entire unit about the shaft 79 is imparted by a reciprocating movement cam 132 which operates against a rigidly mounted cam roller 133. The latter element is secured to an arm 134 formed as an extension of the collar 85. It will be noted that inasmuch as the collar is bolted to the shaft 79 the arm 134 is rigid with respect thereto. Therefore, movement of the cam 132 against its cam roller 133 pivots the entire heel blank feeding unit 52 about the shaft 79.

A vertical lift is given to the heel blank by moving the entire frame 62 longitudinally of the shaft 79 on the bearing collars 86 and 87. This movement is imparted to the frame 62 by means of a lift cam 135 which is secured to an extension 136 of the lift cam bracket 88, the extension 136 being bored centrally (Fig. 13) for the cam shaft 126 to pass therethrough and slide in the extension. Rigidly secured to the cam shaft 126 and arranged to rotate therewith is a cam roller shaft 137 upon which is mounted for rotation a lift cam roller 138. With the tilting cam 129, the reciprocating movement cam 132, and the lift cam 135 arranged as described, it is seen that as the motor 66 drives the worm 122, the worm gear 125 is turned to rotate the jack spindle 103 and the cam shaft 126. As the latter shaft is rotated the cams 129 and 132 are rotated against their respective cam followers to tilt the cradle 61 in a first instance and to move the entire unit inwardly and outwardly about the shaft 79 with respect to the cutter blades. With reference to Fig. 2, it will be noted that the entire unit 52 is positioned with respect to the cutter blades spindle 54 substantially at an angle of 21°. With this arrangement, the weight of the entire unit 52 holds the reciprocating movement cam 132 against its cam roller 133 and accordingly no biasing force is required. Similarly, the weight of the unit holds the lift cam roller 138 against the lift cam 135. In the first instance, the forces acting to hold the cam 132 against its cam follower 133 are not excessive and require no counter-balancing. In the latter case, however, counter-balancing is required and this is provided for by means of a counter-balancing spring 139 which is held in place about a bolt 141 sliding through a hole in the extension 136 of the lift cam bracket 138, and anchored to the cross member 93 of the frame 62. A nut 142 threaded on the bolt 141 is movable along the latter against a washer 143 and provides means for adjusting the amount of the counter-balancing force supplied by the spring 139.

It will be apparent to those skilled in the art that the size and shape characteristics of the finished heel are directly a function of the shape of the tilting cam 129, the reciprocating movement cam 132, and the lift cam 135. Accordingly, when it is desired to change the shape of the heel, it is necessary to change the shape of the cams aforementioned. In the instant invention means are provided for changing all of the movement imparting cams within a matter of a few seconds by employing the type of cams now to be more fully described, reference being had to Figs. 9 to 15. With particular reference to the tilting cam, illustrated in Fig. 10, this cam comprises the cam segment 129 which is interchangeable and which fits against and is mounted on a cam segment mount 144. The cam segment 129 is secured in place on its mount by a cam washer 145 which is held in place by a cam mount 146 of the reciprocating movement cam 132 (see Fig. 4). Here also, the cam segment 132 is removable from its mount 146 and the same is held in place therein by a cam washer 147, both cam assemblies being held in place by a nut 148 threaded onto the cam shaft 126. With reference to Figs. 13, 14 and 15, the lift cam 135 is brazed on or fixed to a removable cam mount 149 which is bolted onto the extension 136 of the lift cam bracket 88. This extension carries a lug 151 thereon which is embraced by the bifurcated arms of the mount 149 to further secure the cam mount 149 in position. With the exception of the cam 135 itself, the cam mount 149 and the lug 151 forms a track upon which the cam roller 133 moves. A thrust bearing 152 (Fig. 4) is located immediately above the cam mount 144 to carry the weight of the frame 62 and its associated mechanism. Other thrust bearings 153 and 154 are provided for similar purposes. With this arrangement of the movement cams it is readily apparent that the cam segments 129, 133 and 135 may be changed at will by simply releasing them from their mounts in a manner considered to be self-explanatory and in selecting different shaped cams capable of producing the required variations in the shape and size characteristic of the heel.

The control mechanism 64, which functions to automatically reverse and stop the motor 66 is also mounted on the frame 62 to move therewith and to be driven by the cam shaft 126. This mechanism, which will be described with the aid of Figs. 16 to 20, comprises two limit switches 155 and 156, the former of which is considered to be the motor reversing switch and the latter the motor stop switch. Each of these switches is operated by a trigger 157 which is pivoted for rotation about a shaft 158. Here, and with reference to Fig. 16, the trigger 157 is biased for rotation about a shaft. Here, and with reference to Fig. 16, the trigger 157 is biased for rotation about a shaft. Here, and with reference to spring actuated plunger 159. To the trigger 157 is attached a leaf spring cam follower 161 which is moved by means of a cam 162 connected to the cam shaft 126 for rotation therewith.

As will be explained in greater detail in connection with the machine's operation, the cam 162 is first rotated by movement of the cam shaft 126 to permit the spring actuated plunger 159 to move the trigger 157 into a neutral position such as that illustrated in Fig. 16, which position the trigger 157 occupies until a portion of the cutting operation has been made. Thereafter it is moved against the reversing switch 155 to actuate the same and later it is moved by the cam 162 against the stop switch 156 to stop the motor. In connection with the movement of the trigger 157 to the neutral and reversing positions, the same is held in these positions by means of a spring pressed detent 163 which is moved into and engages in depressions in the trigger 157. Through the cam operation control mechanism 64, the motor 66 is automatically controlled after the same has been placed in operation by a manually operated start button 165 on the control panel 166. A second switch button 167 operates a switch to cut off completely all power to the machine when the same is to be shut down. The limit switches 155 and 156 are connected with the control panel 166 by means of a cable 168, power being supplied to the panel by a cable 169 and through it by a cable 171 to the motor 66.

As was previously stated, the cradle 61 of the unit mounts the heel ejecting mechanism 121 which is operated in sequence with the movable jaw 108 of the jack 58 to eject a finished heel from the machine after the same has been cut to its desired size and shape. This mechanism, which is illustrated in detail in Figs. 21 to 23, comprises a spring actuated ejector arm 172 which is moved against the heel 59 to "kick" the same free from the jack 58 when the movable jaw 108 is moved vertically to release the heel from the jack. The ejector arm 172 is provided with a rubber tip 173 which actually strikes the finished heel and thereby prevents damage thereto. The ejector arm 172 is moved by a combined compression and torsion spring 174 surrounding a vertically movable plunger 175 supported for movement in two brackets 176. The plunger 175 has a collar 177 secured thereto in which one end of the torsion spring 174 is anchored. It also has attached to the end thereof a cocking arm 178 that is moved to rotate the plunger 175 against the forces of the torsion spring 174 by means of a roller 179 supported on an ejector actuating arm 181. At the top of the plunger 175, a lug 182 is secured thereto which is moved against one face of a shoulder section 183 forming a part of the ejector arm 172 to move the latter arm. Also attached to the plunger 175 is a trigger pin 184 which is held in a recess suitably provided in the lower bracket 176 by the compressive force of the spring 174. A plunger actuating rod 185 is bracketed for vertical movement within a hole 186 (Fig. 6) drilled in the cross bar 111. This rod is moved by an ejector release cam 187, secured to the shaft 116, upon rotation of the latter by the jack operating handle 120. With reference to Fig. 4, which shows the relative positions of the jack operating cams 115 and the ejector release cam 187, it will be seen that, as the jack operating handle is moved to its lowermost position to clamp the heel blank between the movable jaw 108 and its seat 104, the ejector actuating arm 181 is moved to rotate the cocking arm 178 from its dotted line to its full line position as is shown in Fig. 23. This rotates the plunger 175 until the trigger pin 184 moves into its recess in the bracket 176 as is shown in Fig. 21, and the ejector mechanism is in cocked position. Here, it is to be noted that the arm 172, which is floating about the plunger 175, is free to move against a stop 188 and carry it rearwardly to the full line position shown in Fig. 22. It is to be further noted that, with respect to the cocking arm 178 and the shoulder section 183 of the ejector arm 172, a loose motion area is provided. Thus the ejector arm 172 is free to move from a first to a second dotted line position illustrated in Fig. 22 without encountering any stop mechanism. Hence, as the jack operating arm 120 is moved upwardly to move the cross bar 111 and incidently to move the movable jaw 108 upwardly to release the finished heel from the jack, the high point of the ejector cam is moved against the plunger actuating rod 185. This, in turn, forces the plunger 175 downwardly against the action of the spring 174 until the trigger pin 184 is moved out of its slot in the bracket 176. Thereafter, the torsion action of the spring 174 rotates the plunger 175 in a clockwise direction. This rotative action of the plunger 175 moves the lug 182 against the shoulder section 183 of the ejector arm 172 and causes the same to move its rubber tip 173 against the finished heel 59 and eject it from the jaws of the jack.

Before turning to a modified form of the driving gear, by means of which the jack spindle 103 and the cam shaft 126 are turned, it is to be pointed out that the unique mounting arrangement of the heel blank feeding unit with respect to its cutter blades provides a series of adjustments which can be quickly made to condition the machine to turn various heights and sizes of heels. These adjustments, although previously referred to, are to be pointed out more particularly with reference to Figs. 1, 2 and 3. With reference to Fig. 1, it will be seen that the feeding unit may be removed readily with respect to its cutter blades in a first adjustment by loosening the bolts 71 and moving the entire unit by the Vernier adjustment bolt 72. A tilting adjustment can also be given to the unit by loosening the lock nut assembly 77 and rotating the same on the shaft 75 in the shaft-receiving section 74 of the shaft bracket 76. A vertical lifting adjustment may also be given to the entire unit 52, by loosening the bolts 81 and moving the shaft 79 by means of the screw 83 relatively to the shaft bracket 76 which is attached to the cutting unit 51. In this manner three adjustments can be made to the machine which are in the same sense as the movements imparted to the heel blank by the heel blank feeding unit 52 as controlled by the cams aforementioned.

While the mechanism employed in the embodiment of the invention illustrated in Figs. 1 to 5, for driving the jack spindle 103 and the cam shaft 126, is desirable and one which has been proven to be operative, it is possible that through continued use and wear the double universal joint 127 may become loose and permit a small amount of backlash or unwarranted movement of the jack spindle 103. Accordingly, it is proposed to power both the jack spindle 103 and the cam shaft 126 from a single power source in a manner illustrated in Fig. 24. Here the worm 122 and the worm gear 125 are connected to the motor 66 through the coupling 123 in a manner identical to that described for the previous embodiment. However, the shaft for the worm 122 is extended through the bearing 124 and carried thereon is a first miter gear 189 which meshes with a second miter gear 190 connected to a shaft section 191. The latter element is journalled for rotation in a bearing carried in a suitable bracket 192 on the outside of the frame 62. A double universal joint 193 and a slip joint 194 connects the shaft section 191 with another shaft section 195 bearinged in a bracket 196, and having fixed thereto a miter gear 197 meshing with another miter gear 198, which is fixed to a worm shaft 199. A second worm 201 is fixed to the shaft 199 and rotates a worm gear 202 connected with the jack spindle 103. Thus, the power for rotating the jack spindle 103 and the cam shaft 126 is transmitted through two pairs of miter gears, a double universal joint and a slip joint carried externally of the frame 62. In this manner the worm 201 and the worm gear 202 provide a lock gear for the jack spindle 103 in identically the same manner as does the worm 122 and the worm gear 125 for the cam shaft 126. With this arrangement of the power train, continued use will not affect appreciably the amount of free movement of the jack spindle 103 and imperfections due to this free motion will not be present in the finished heel.

Operation

The operation of the embodiment of the invention illustrated in Fig. 1 will be described with the aid of Figs. 29 to 33 inclusive. In discussing the machine's operation only one cutter will be described since it is to be recalled that the two cutting units forming the complete machine are employed only to eliminate lost time due to loading and unloading. What is to be said for one unit therefore applies to the other with the exception to that fact that the starting cycle of the two heel blank feeding units 52 and 53 are initiated at different times so that one heel blank is being cut in one of the cutting assemblies while the other is being loaded.

With particular reference being had to the heel blank feeding unit 52, a heel blank is placed on the plate 104 of the jack 58 and is gauged against the gauge plate 106. Thereafter, by means of movement of the jack operating arm 120 the movable jaw 108 is lowered to engage the top lift 109 of the heel blank all in a manner as described. At this point in the cycle of the operation the tilting cam 129, the reciprocating movement cam 132, and the cam follower 138 of the lift cam 135 occupy the relative positions illustrated in Fig. 29. Furthermore the control cam 162 has come to rest at the position indicated in this figure. With all of these cams occupying positions relative to their cooperative cam and cam followers, the machine may be thought of as conditioned for the initiation of a cutting cycle. When thus conditioned, the starting button 165 on the control panel 166 (Fig. 2) is manually operated to put the machine in operation. Immediately upon energization of the electric motor 66 the jack spindle 103 and the cam shaft 126 of the unit 52 are caused to rotate in a counter-clockwise direction. Insofar as the heel blank is concerned, its rotation about its vertical axis is said to be with the direction of rotation of the cutter blades 56, the direction of rotation of both elements being indicated by the directional arrows. To the art this operation is known as back cutting and the cut is made with the grain of the wood of the heel blank so that no damage is done to the breast edge of the blank.

As the cam shaft 126 begins to rotate in a counter-clockwise direction, the tilt cam 129 is moved along a portion thereof against its cam follower or roller 131 without imparting appreciable tilting action to the cradle 61. The reciprocating movement cam 132 which is also at its high point with regard to its follower 133 begins to move the entire heel blank feeding unit 52 toward the cutter blades 56 to begin the cutting operation. Also, the cam roller 138 of the cam 135 begins to engage the inclined surface of the cam 135 to lift slightly the entire heel blank feeding unit 52, thereby lifting the heel. Further, the cam 162 is turned until a stop face 203 is moved away from the cam follower 161 to permit the spring pressed plunger 159 to move the trigger 157 into a neutral position. Here, by means of the spring pressed detent 163, the trigger 157 is maintained in a neutral position until a subsequent movement of the cam follower 161 moves the trigger 157 to a reversing position.

Under this series of movements the heel blank 59 is turned against the cutter blades to cut a portion of the blank extending from the right breast edge thereof toward the back of the heel to an amount equal to approximately ½ revolution of the heel blank about its vertical axis. The amount of this cutting usually varies from 150 to 160 degrees.

Figure 29:
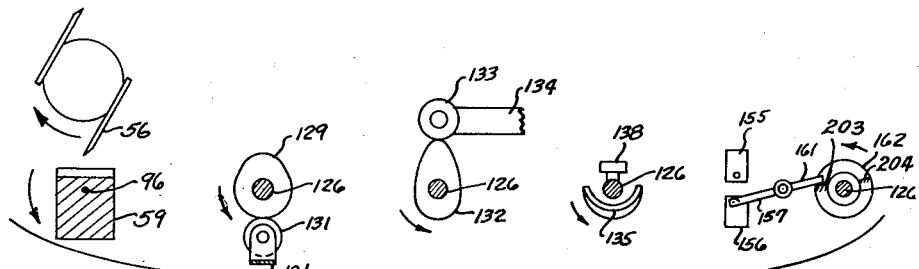
Figure 30:
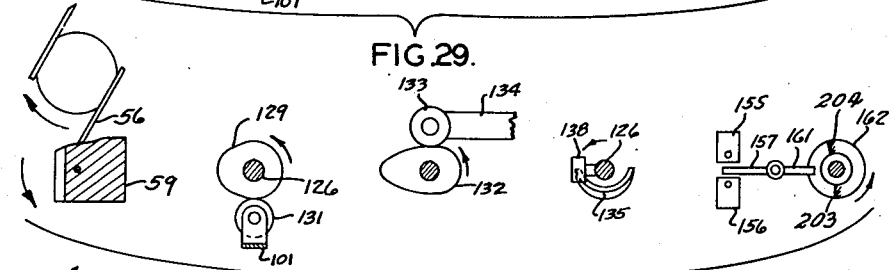
Figure 31:
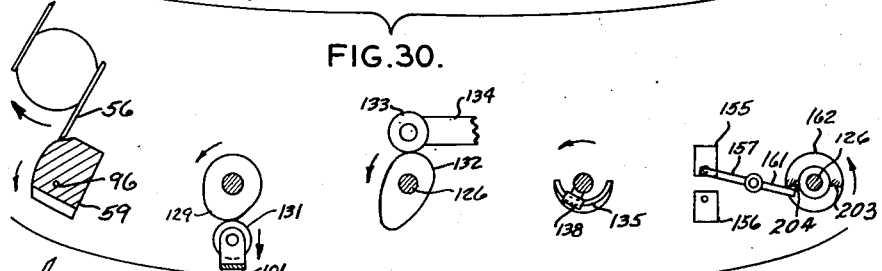
Figure 32:
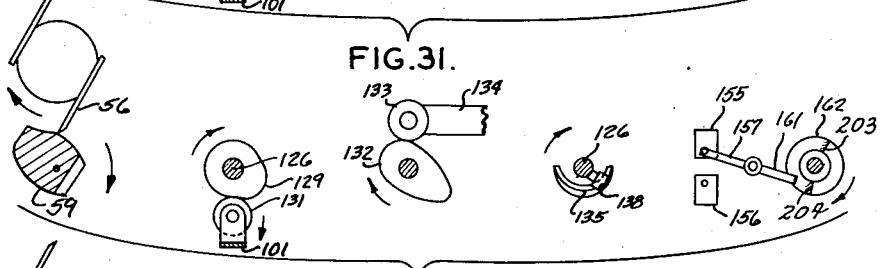
Figure 33:
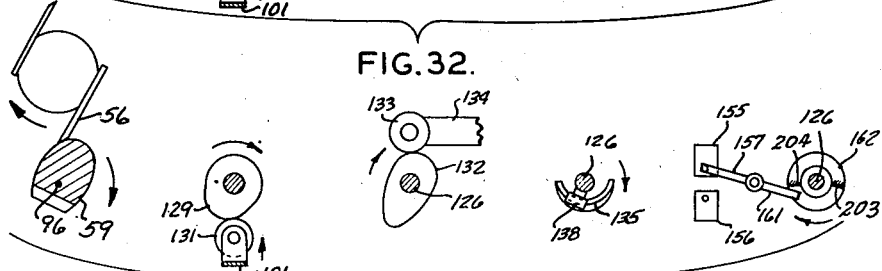

Since rotation in a counter-clockwise direction of the cam shaft 126 has turned the control cam 162 through approximately 160 degrees, a second stop face 204 (Fig. 31) of the cam 162 is moved against the cam follower 161 and the trigger 157 is moved to actuate the reversing switch 155 and the direction of rotation of the motor 66 is reversed to turn the jack spindle 103 and the cam shaft 126 in a clockwise direction. While no limitation as to rotative speeds is intended, it has been found in practice that the first movement of the jack spindle 103 may be made at approximately 11½ R. P. M. and the reversed or clockwise movement thereof at approximately 23 R. P. M. Hence, after the control mechanism 64 has been conditioned to reverse the motor, the heel blank is turned in a clockwise direction at approximately twice the rate at which the first cut of the heel was made and this cut is completely retraced without the blades coming in contact with the heel blank until the uncut portion of the heel blank is presented to the cutter. The relative positions of all of the movement cams and control cams throughout this portion of the cycle of the operation is illustrated in Figs. 29 to 30. As the cam shaft 126 is continued to be rotated at this accelerated speed, the heel blank, through the action of the tilting cam 129, the reciprocating movement cam 132 and the lift cam 135, is gradually tilted into the path of the cutter blades 56, is moved inwardly toward the blades, and is lifted vertically to give to the heel its desired shape, all in a manner well known in the art. In effecting these movements, it is to be noted that the maximum tilt is given to the cradle 61 at a point of cutting with respect to the heel blank coincident with the center line of the back of the heel. At this point a minimum of inward movement is made and a maximum amount of lift movement is imparted to the blank.

As the heel blank is continued to be rotated by the jack spindle 103 and its associated apparatus in a clockwise direction, the cam follower 161 of the control mechanism 64 is moved from a lower cam segment 205 of the cam 162 to an upper cam segment 206 which are connected by an inclined plane 207. The cam follower 161 therefore passes over the stop face 204 and the jack spindle 103, and incidently, the heel blank 59 is permitted to rotate in a clockwise direction through approximately 1½ revolutions to complete the entire cutting operation on the heel blank. As the cam follower 161 rides on top of the cam segment 206 the cam 162 is moved until the follower 161 falls into an opening 208 in the cam segment 206 whereat it drops down onto a ledge 209. Continued movement of the cam face 203 against the cam follower 161 actuates the trigger 157 to operate the stop switch 156 and deenergized the motor 66 thus stopping the operating cycle and returning the various cam positions previously described to a starting attitude substantially illustrated diagrammatically in Fig. 29.

It is to be particularly noted that the rotation movement imparted to the heel blank 59 during the cutting operation is effected first in a counter-clockwise direction through approximately 160 degrees, and thereafter reversed to rotate in a clockwise direction approximately 1½ turns. In this manner the heel blank is turned against a single rotating cutter in a manner such that the cut is made in all respects with the grain of wood and further that the entire cutting operation of the heel is made on only one cutter. Moreover, since the heel blank is first turned about its longitudinal axis through something less than ½ revolution and is thereafter turned with reverse motion through approximately 1½ revolutions, the cut at the back of the heel is made continuous and no overlapping cuts are made which will produce an imperfection thereon known to the art as "back line."

*First modification*

As previously stated the relative movement of the heel blank with respect to the cutter may be effected either by moving the heel blank against a stationary rotating cutter with the three movements previously described or by moving both the heel blank and the cutter blades. In the embodiment of the invention now to be described and as is illustrated in Figs. 25 to 28, inclusive, the cutter blades as well as the heel blank are moved. In this embodiment of the invention a shoe heel turning machine is provided which has a base 211 mounting two vertical gibs 212 in which a frame 213, similar to the frame 62 of the modification illustrated in Fig. 3, slides. This frame supports a cradle 214, a jack 215, an ejector 216 and a control mechanism 217, which are similar in all respects with their corresponding mechanisms 61, 58, 121 and 64 of the embodiment of the invention illustrated in Fig. 3. In addition, a jack spindle 218 and a cam shaft 219 are driven by a reversing motor 221 and its associated apparatus including miter gears 189', 190', 197' and 198'; shafts 191' and 195'; brackets 192' and 196'; a double universal joint 193'; a slip joint 194', a worm shaft 199', a worm 201' and a worm gear 202', identical with the elements designated by unprimed corresponding numbers and as described for the embodiment of the invention illustrated in Fig. 24. Here, a tilting motion is given to the cradle 214 about the trunnions 220 (Fig. 25) by a tilt cam 222 in the same manner as the cradle 61. Also, vertical movement of the frame 213 is provided within the vertical gibs 212 by a lift cam 223. Therefore, with respect to the tilting movement of the heel blank and, also, the lift movement thereof, these functions are performed in identically the same manner as that described for the previous embodiment of the invention.

Figure 25:
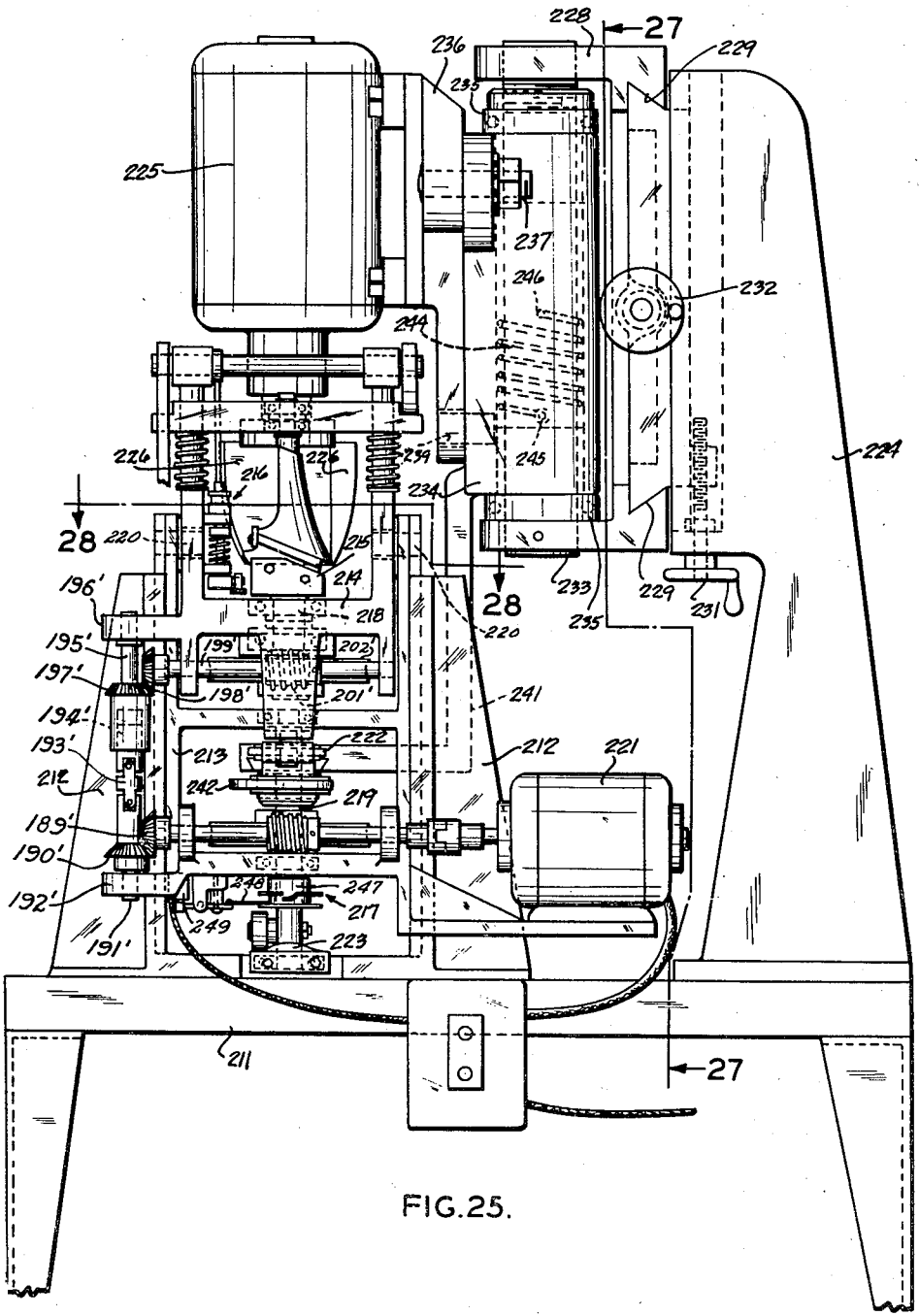
Figure 26:
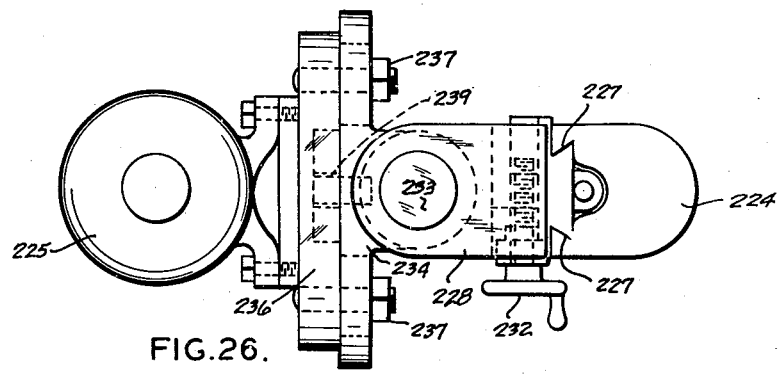
Figures 27, 28:
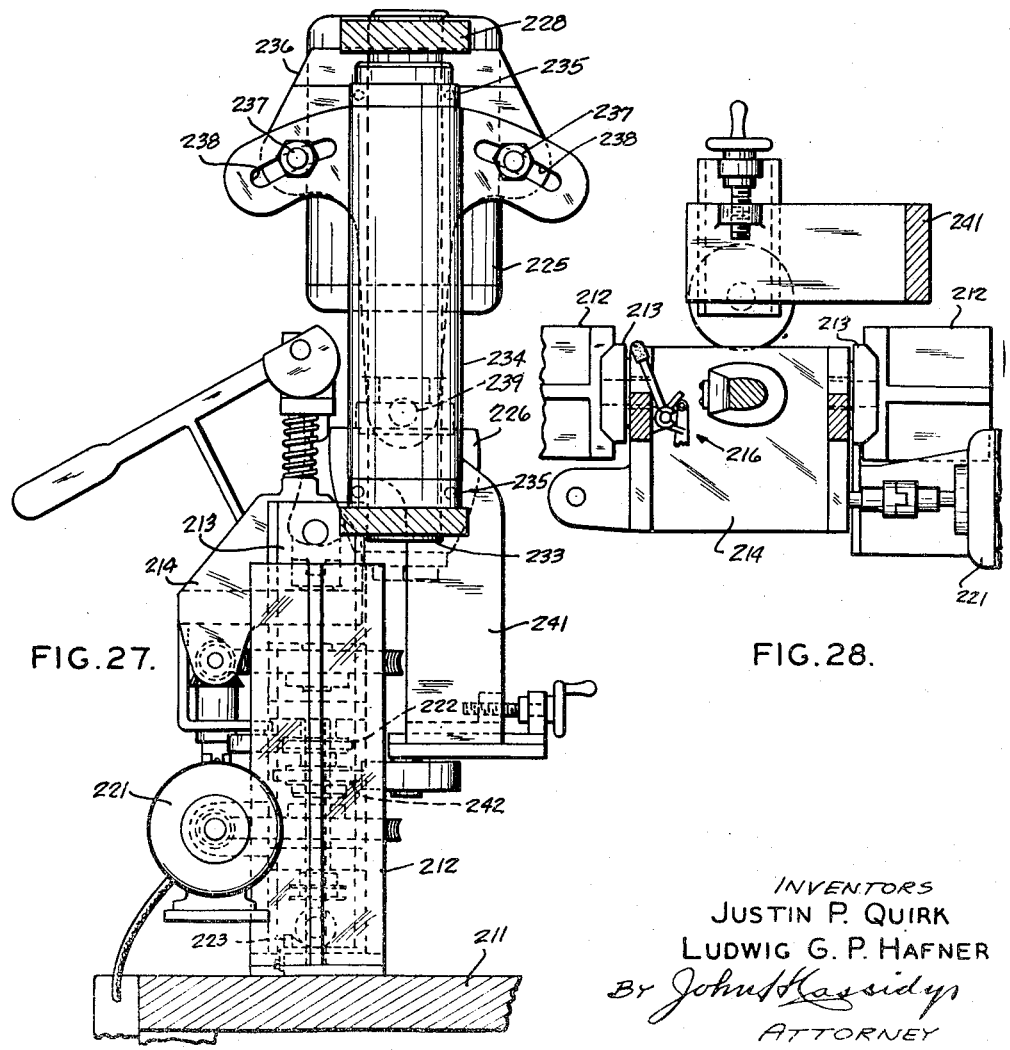

The notable exception between the two disclosures lies in the modified structure by means of which relative reciprocating movement of the heel blank and the cutter blades is effected. With reference to Fig. 25 a column 224 is raised from the base 211 to support for hinged movement a cutter motor 225. This motor has connected directly to its shaft a plurality of cutter blades 226 which are of similar shape but in inverted order as the cutter blades 56 of the previous embodiment.

Riding in the vertical gibs 227 (Fig. 26) in the column 224 is a hinge bracket 228 which is also supported on horizontal gibs 229 (Fig. 25). This bracket is moved both vertically in its vertical gib by means of a hand wheel 231, and horizontally in its horizontal gibs by means of another hand wheel 232. Passing through holes in the extensions of the hinge bracket 228 is a hinge pin or shaft 233 which is secured against rotation in the bracket. A second hinge bracket 234 is carried on the hinge pin or shaft 233 and is arranged to pivot on said pin or shaft between extensions of the bracket 228 on thrust bearings 235.

A motor bracket 236, to which the cutter motor 225 is attached, is connected with the hinge bracket 234 by means of two threaded studs 237. These studs are passed through two slots 238 in the hinge bracket and permit a pivotal adjustment of the vertical axis of the motor shaft about an anchor pin 239 by means of which the motor bracket 236 is also attached to the hinge bracket 234.

A shape cam roller bracket 241 is connected to the hinge bracket 234 and, under the action of a shape cam 242, is movable to pivot the motor 225, the motor mounting bracket 236 and the hinge bracket 234 about the hinge pin or shaft 233 to thus move the rotating cutter blades relatively to a heel blank. For continuously biasing the whole motor assembly to rotate about the hinge pin or shaft 233 against the shape cam 242, a torsion spring 244 is provided which is located internally of the bore of the hinge bracket 234 and externally of the shaft pin 233. One end of the torsion spring 244 is anchored at 245 to the hinge bracket 234 and the other end to the shaft or pin 233 at 246.

In this embodiment of the invention the tilting and lifting movements imparted to the heel blank are accomplished in substantially the same manner as that which was described for the first embodiment of the invention. The relative reciprocating movement of the blank and the cutter blades is effected, however, by movement of the cutter blades.

Insofar as the sequence of movements is concerned the operation of this machine is identical with that described for the previous embodiment and the relative positions of the various cams, both movement cams and control mechanism cams, are the same and may be traced through one cycle of operation with the aid of Figs. 29 to 33, it being necessary only to apply the appropriate numbers of cams that are changed. In this regard, it is to be pointed out that the control mechanism 217 is identical with the control mechanism 64 illustrated in Figs. 16 to 20 inclusive. Here, a control cam 247 (Fig. 25) is identical with the cam 162, described; a cam follower 248 with the follower 161; and two cam operated switches 249 and 251 (not shown) with the switches 156 and 157.

As is true with the first embodiment of the invention, adjustments can be made to this modification with equal dispatch since the cams employed are identical and are assembled on their cam shaft in identically the same manner. Moreover, vertical, horizontal and tilting adjustments are easily made in this machine by operation of the hand wheels 231 and 232 as pertains to the vertical and horizontal adjustments and by the pivoting of the motor bracket 236 about its anchor pin 239 for the tilting adjustment.

From the foregoing description it will be apparent to those skilled in the art that the heel blank feeding unit shown and described offers great possibilities for the advancements in the shoe heel turning art. Although not included as a part of this application it is apparent that the machine is adapted to receive suitable loading and unloading mechanisms which will make the same entirely automatic from a standpoint of operation. Moreover, the feeding unit is compact and can be removed readily and replaced by another unit. Further a plurality of these units, because of this feature, can be mounted on a turntable or conveyor for step by step operations or other purposes.

Summary

By way of summarizing, it is essential to treat the salient features of the invention in further detail to more fully define their contributions to the art. Of particular importance is the mounting of the heel blank jack in the cradle 61 which is pivoted for tilting movement about the trunnions 98 and 99. In the prior art devices, the tilting of the heel blank has been accomplished by means which make it impossible to bring the tilting axis into a position where it passes through the heel blank itself. For this reason it has been possible to tilt the heel blank into the path of a cutter on only one radially disposed axis perpendicular to the longitudinal axis of the heel blank. With the present invention it is possible to locate the trunnions about which the cradle pivots in any desired position with respect to the heel blank so that the tilting axis can be positioned above, below or within the heel blank. Further, this unique arrangement of the parts makes it possible to tilt the heel blank about an infinite number of radially disposed axes which are perpendicular to the vertical longitudinal axis of the heel blank. As will be apparent to those skilled in the art this provision of the instant invention makes it adaptable to produce heel blanks of many different styles and shapes not heretofore known in the art.

The elimination of the "back line" has been mentioned before as resulting from the unique rotating movement imparted to the heel blank. This feature of the invention is to be emphasized to the degree that the particular rotative movement of the heel blank against a single cutter rotating in a single direction is thought to be new. Thus by first rotating the heel blank through approximately 160 degrees to effect the initial cut as a back cutting operation and thereafter turning it through 1½ revolutions to finish the heel, no over-lapping cut capable of leaving a back line on the finished heel is possible. With the elimination of this imperfection to the finished heel a costly scouring operation is eliminated.

As to the structural features of the machine which adds to its utility and long life, to its accurate cutting operations and so forth, it is to be pointed out that the embodiment of the heel blank feeding unit's driving mechanism illustrated in Fig. 24 eliminates the possibility of back lash movement to the heel blank jack and its associated mechanisms. Further, and in this same regard, the method of mounting the driving motor 66 to move with the heel blank feeding unit enables the same to be directly connected to the various mechanisms which it is intended to drive. Moreover, the double universal joint and slip joint provided permits the cam shaft and the jack spindle shaft to turn as a single unit, yet provides for the tilting of the jack spindle axis.

The rapid inter-changeability of the shaping, lift and tilting cams to provide for different shaped heels and different shape characteristics resides in the use of the horse-shoe cams described.

In addition to the adjustments which may be made by changing the cams as aforesaid it is also to be pointed out that quantitative vertical, tilt, and reciprocating movement adjustments are easily made to the heel blank feeding unit through the means previously described in detail.

Through this combination of features as embodied in the instant invention, it is possible to produce a finished article in a single operation which is superior to those heretofore known in the art. Furthermore, it is possible to condition the machine for the production of various sized and shaped heels with dispatch.

Various changes may be made in the details of construction within the scope of the appended claims, without departing from the spirit of this invention. Parts of the invention may be used without the whole and improvements may be added while retaining some or all of the advantages of the invention.

What is claimed is:

1. In a shoe heel turning machine the combination of a high speed rotating cutter having a plurality of cutter blades mounted thereon, a heel blank feeding mechanism for moving a heel blank into cutting engagement with said rotating blades having means for rotating said heel blank in a first direction in a same sense as that of said cutting blades, said first rotative movement of said heel effecting a back cutting operation, means for reversing the rotative movement of said heel blank to thereafter turn the same through approximately 1½ revolutions in a reversed direction, separate means for causing said heel blank to be moved with respect to said cutter blades with reciprocating and lifting movements, respectively, and means for tilting said heel blank with respect to said cutter blades about an infinite number of radial axes perpendicular to a vertical longitudinal axis of said heel blank.

2. In combination with a shoe heel turning machine having a high speed rotating cutter mounting a plurality of cutter blades and a support for said cutter, a heel blank feeding unit for moving a heel blank into the path of said rotating cutter blades comprising a unit mounting means attached to said support, means included within said mounting means for pivotally positioning said heel blank feeding unit with respect to the vertical axis of said rotating cutter for adjustably positioning said unit horizontally with respect to said rotating cutter, and for adjusting said unit vertically with respect to said rotating cutter, a frame forming a part of said unit, a cradle mounted for movement about a pivot connecting the same with said frame, a jack supported for rotative movement within said cradle and adapted to be tilted with said cradle, means for operating said jack to receive and clamp a heel blank, an electric motor associated with said heel blank feeding unit and supported to move therewith for imparting rotative movement to said jack and to a cam shaft mounted for rotative movement within said unit frame, a plurality of cams and cam followers associated with said cam shaft, said cradle and said frame to move said frame horizontally and vertically with respect to said rotating cutter and to move said cradle with a tilting movement about said pivot, and a cam operated control means associated with said cam shaft for controlling the operation of said electric motor whereby said heel blank is rotated with respect to said rotating cutter in a first direction through an angulation of approximately 160 degrees about the vertical horizontal axis of said heel blank and thereafter in a reversed direction through approximately 1½ revolutions about said axis.

3. In combination with a shoe heel turning machine having a high speed rotating cutter mounting a plurality of cutting blades and having a heel blank feeding unit arranged to move a heel blank retained therein with respect to said cutting blades with a reciprocating lift, and tilting movement, an electric motor for imparting rotative movement to said heel blank, and means for controlling the operation of said electric motor comprising a plurality of cam operated switches said control mechanism directing the rotative movement of said electric motor to cause said heel blank to be rotated in a first direction through approximately 160 degrees about a vertical longitudinal axis of said heel blank and thereafter to cause the rotation of said heel blank in a reversed direction about said axis through approximately 1½ revolutions.

4. In a heel making machine having a tool and a support therefor, improved means for holding and moving a heel blank relatively to the tool comprising a vertically disposed slide fixed with respect to said support, a frame mounted on said slide, a cradle supported on a horizontal axis in said frame, a shaft journalled vertically in the cradle along an axis normal to the axis of the cradle, a jack arranged and adapted to clamp a heel blank on the upper end of the shaft, a driving mechanism connected to rotate said shaft, a cam associated with the driving mechanism and having a follower and a connecting means for tilting the cradle on its axis, and a second cam associated with the driving mechanism and having a follower and connecting means for moving the frame along its slide.

5. In a machine for operating on a work piece to give the same a desired shape, the combination of a tool mounted within a suitable support, and a work piece feeding unit mounted on said support arranged to feed a work piece clamped therein with respect to said tool comprising a mounting bracket attached to said support, a shaft bracket having a shaft extension journalled for rotation in said mounting bracket, a mounting shaft rigidly retained in said shaft bracket and disposed at an angle with respect to said tool, a frame supported on said mounting shaft and arranged to move longitudinally therealong in bearinged collars connecting said frame to said mounting shaft, a cradle mounted in said frame and adapted to be tilted about trunnions connecting said cradle with said frame, a jack supported in said cradle and adapted to releasably hold a work piece therein, a jack shaft journalled for rotation in said cradle and adapted to rotate said jack and said work piece about an axis normal to the trunnion axes of said trunnions connecting said cradle with said frame, a cam shaft journalled for rotation in said frame, means including a double universal joint and a slip joint for connecting said cam shaft and said jack shaft whereby said jack shaft may be rotated with said cam shaft when the same is moved from a position coaxially with said cam shaft, an electric motor mounted on said frame for pivotal movement therewith and adapted to drive said cam shaft and said jack shaft, means including first, second and third cams and cooperating cam followers associated with said cam shaft for, first, tilting said cradle, said jack and said work piece about an axis normal to the longitudinal axis of said work piece about which the same is rotated, secondly, to pivot said frame about said mounting shaft to thereby move said work piece with reciprocating movement toward and away from said tool and, thirdly, to move said frame vertically, longitudinally of said mounting shaft, and means for controlling the operation of said electric motor comprising a plurality of switches and cam means associated with said cam shaft for operating said switches whereby said electric motor is made to rotate said work piece about its longitudinal axes through an angulation less than ½ revolution at a first rate of speed and thereafter to reverse the rotation of said work piece and turn the same through approximately 1½ revolutions at a speed greater than the speed of the first rotation.

6. A machine as claimed in claim 5 including means for adjusting said mounting bracket with respect to said support, means for pivotally adjusting said shaft bracket in said mounting bracket, and means for adjusting said mounting shaft in said mounting bracket along an axis parallel to the longitudinal axis of said mounting shaft.

7. A machine as claimed in claim 5 including means mounted on said cradle for automatically ejecting a work piece from said jack upon its release by said jack.

8. A machine as claimed in claim 5 including means for adjusting said mounting bracket with respect to said support, means for pivotally adjusting said shaft bracket in said mounting bracket, means for adjusting said mounting shaft in said mounting bracket along an axis parallel to the longitudinal axis of said mounting shaft, separate mounts for releasably supporting said first, second and third cams, means adaptable for support in said mounts for altering the movements of said work piece with respect to said tool, and means mounted on said cradle for automatically ejecting a work piece from said jack upon its release by said jack.

9. In a machine for turning shoe heels, a rotating cutter, a support for said cutter, a shoe heel blank feeding unit mounted on said support, and means included within said shoe heel blank feeding unit for moving said shoe heel blank with respect to said cutter vertically along a longitudinal axis of said heel blank and with a tilting movement about an axis normal to said longitudinal axis of said blank, means for imparting relative movement of said blank and said cutter each to the other, and means for rotating said heel blank about its longitudinal axis in a first direction through approximately ½ revolution and in a reverse direction through approximately 1½ revolutions.

10. In a machine for turning shoe heels, a supporting base, a plurality of vertically disposed gibs supported on said base, a frame carried within said vertically disposed gibs and adapted for vertical movement therein, a cradle supported in said frame and adapted to be tilted therein, a jack supported in said cradle and adapted to releasably hold a shoe heel blank therein, a jack shaft journalled in said cradle and arranged to rotate said jack, a cam shaft journalled in said frame, means including a double universal joint and a slip joint for rotatably connecting said cam shaft and said jack shaft, a first electric motor for rotating said cam shaft and said jack shaft, a column rising from said base and mounting horizontal and vertical gibs, a hinge bracket connecting with said vertical and horizontal gibs attached to said column, a motor bracket attached to said hinge and adapted to pivot about a hinge bracket pin thereof, a second motor connected to said motor bracket and adapted to drive a rotating cutter attached to a motor shaft thereof, means retained within said hinge for urging said second motor and the rotating cutter driven thereby toward the said heel blank supported in said jack, a first cam means associated with said cam shaft for imparting a tilting movement to said cradle within said frame, a second cam means associated with said cam shaft for imparting vertical movement to said frame within said vertical gibs supported on said base and a third cam means for imparting reciprocating movement to said second motor and said rotating cutter by pivotally moving the same about the said hinge pin carried in said hinge bracket, and control means including a plurality of cam operated switches for controlling the operation of said first electric motor whereby said heel blank mounted in said jack is rotated in a first direction at a first speed through an angulation less than ½ revolution and in a reverse direction at a second speed greater than the first through an angulation of approximately 1½ revolutions.

11. A machine as claimed in claim 10 including means for adjusting said hinge bracket vertically and horizontally within said vertical and horizontal gibs supported by said column, and means for adjusting said second motor pivotally about a means connecting said motor bracket with said hinge.

12. A machine as claimed in claim 10 including means for making adjustments to said first, second and third cam means whereby the relative movements of said heel blank with respect to said rotating cutter may be changed.

13. A machine as claimed in claim 10 including means mounted in said cradle for automatically ejecting said shoe heel blank from said jack upon its release by said jack.

14. A machine as claimed in claim 10 including means for adjusting said hinge bracket vertically and horizontally within said vertical and horizontal gibs supported by said column, means for adjusting the axis of said motor shaft pivotally about a means connecting said motor bracket with said hinge, means for making adjustments to said first, second and third cam means whereby the relative movements of said heel blank with respect to said rotating cutter may be changed, and means mounted in said cradle for automatically ejecting said shoe heel blank from said jack upon its release by said jack.

15. In combination with a heel blank feeding unit operative to move a shoe heel blank with respect to a tool and having a frame movable vertically and reciprocatively with respect to said tool and a cradle mounting a jack in which said heel blank is releasably held adaptable to be tilted about trunnions connecting the same to said frame, said cradle journalling a jack shaft for rotating said jack and said frame journalling a cam shaft for rotation with said jack shaft, means for driving said jack shaft and said cam shaft comprising a motor supported on said frame, a drive shaft connecting with said motor, and means connecting with said drive shaft for rotating said cam shaft and said jack shaft.

16. In combination with a heel blank feeding unit operative to move a shoe heel blank with respect to a tool and having a frame movable vertically and reciprocatively with respect to said tool and a cradle mounting a jack in which said heel blank is releasably held adaptable to be tilted about trunnions connecting the same to said frame, said cradle journalling a jack shaft for rotating said jack, and said frame journalling a cam shaft for rotation with said jack shaft, means for driving said jack shaft and said cam shaft comprising a motor supported on said frame, a drive shaft connected with said motor, a worm attached to said drive shaft, a worm gear connected to said cam shaft and meshing with said worm, and a double universal joint and a slip joint connecting said cam shaft with said jack shaft.

17. In combination with a heel blank feeding unit operative to move a shoe heel blank with respect to a tool and having a frame movable vertically and reciprocatively with respect to said tool and a cradle mounting a jack in which said heel blank is releasably held adaptable to be tilted about trunnions connecting the same to said frame, said cradle journalling a jack shaft for rotating said jack and said frame journalling a cam shaft for rotation with said jack shaft, means for driving said jack shaft and said cam shaft including a motor supported on said frame, a drive shaft journalled within said frame and connected with said motor, a first worm attached to said drive shaft, a first worm gear mounted on said cam shaft and meshing with said first worm, a first miter gear attached to said drive shaft, a second miter gear, a double universal joint and a slip joint connecting said first miter gear to said second miter gear, a driven shaft mounting said second miter gear and journalled for rotation in said cradle, a second worm attached to said driven shaft, and a second worm gear mounted on said jack shaft to be driven by said second worm.

18. In a machine for turning shoe heels having a heel blank feeding unit in which a heel blank is mounted for rotational movement against a rotating cutter, the combination of an electric motor adapted to rotate said heel blank, and means for controlling the operation of said electric motor comprising a first and second limit switch, a switch actuating means associated with said first and second limit switches and adapted to operate said switches, a cam follower attached to said actuating means, a dual plate cam connected with the means for rotating said heel blank and adapted to rotate therewith, and means associated with said dual plate cam for moving against said cam follower in a first instance to displace said switch actuating means from a position for actuating said second switch to a neutral position for approximately ½ rotation of said dual plate cam and thereafter to move said switch actuating means against said first limit switch to effect a reverse movement of said electric motor and cause the rotation of said dual plate cam through approximately 1½ turns and thereafter to move said switch actuating means against said second limit switch to stop said electric motor.

19. In a heel making machine having a tool and a support therefor, improved means for holding and moving a heel blank relatively to the tool comprising a vertically disposed slide fixed with respect to said support, a frame mounted on said slide, a cradle supported on a horizontal axis in said frame, a shaft journalled vertically in the cradle along an axis normal to the axis of the cradle, a jack arranged and adapted to clamp a heel blank on the upper end of the shaft, a first cam associated with the driving mechanism and having a follower and a connecting means for tilting the cradle on its axis, a second cam associated with the driving mechanism and having a follower and connecting means for moving the frame along its slide, and a third cam having a cam follower and connecting means for moving said heel blank and said tool relatively each to the other with reciprocating movement.

20. In a shoe heel making machine, the combination of a tool, a feeding mechanism for moving a heel blank into engagement with said tool including means for rotating said heel blank, separate means associated with said feeding mechanism for causing said heel blank to be moved with respect to said tool with reciprocating and lifting movements respectively, and means for tilting said heel blank with respect to said tool about an infinite number of radial axes perpendicular to a vertical longitudinal axis of said heel blank.

21. In combination with a machine for making a shoe heel having a tool for operating on a heel blank and having a heel blank feeding unit arranged to move the heel blank with reciprocating, lift and tilting movements into the path of said tool, means within said heel blank feeding unit for providing said tilting movements comprising a cradle supported on a horizontal axis, a vertically disposed shaft rotatably mounted in the cradle for turning the blank, and a jack secured to the upper end of said shaft for holding the blank.

22. In a machine for turning shoe heels, a rotating cutter, a support for said cutter, a shoe heel blank feeding unit mounted on said support, and means included within said shoe heel blank feeding unit for moving said shoe heel blank with respect to said cutter vertically along a longitudinal axis of said heel blank and with a tilting movement about an axis normal to said longitudinal axis of said blank, means for imparting relative movement of said blank and said cutter each to the other, and means for rotating said heel blank in a first instance for a fraction of one revolution and reversing the rotation of said heel blank for approximately one and one-half revolutions.

23. In combination with a machine for making a shoe heel having a tool for operating on a heel blank and having a heel blank feeding unit arranged to move the heel blank with reciprocating, lift and tilting movements into the path of said tool, means forming a part of said feeding unit for effecting said tilting movement comprising a cradle, a rotatable clamping device for said heel blank mounted in said cradle, a pivot support for said cradle about which the same is movable to tilt said heel blank about axes normal to the longitudinal axis of said heel blank, and a cam with follower and connecting means for imparting a tilting movement to said cradle.

24. In a machine for operating on a work piece to give a desired shape and having a support and a driven tool on the support, the improvement comprising a blank feeding mechanism having a frame mounted on the support, a cradle pivotally supported in the frame, a shaft journalled in the cradle along an axis normal to the pivot of the cradle, a clamp on the end of the shaft constructed and adapted to hold a blank to the shaft, driving mechanism for the shaft, a rotating cam connected to said driving mechanism, and thereby driven in synchronism with the said shaft and the blank held thereto, and a cam follower with connecting means for tilting the cradle on the pivotal support.

25. In a machine for operating on a work piece to give a desired shape and having a support and a driven tool on the support, the improvement comprising a blank feeding mechanism having a frame mounted on the support, a cradle pivotally supported in the frame, a shaft journalled in the cradle along an axis normal to the pivot of the cradle, a clamp on the end of the shaft constructed and adapted to hold a blank to the shaft, driving mechanism for the shaft, a rotating cam connected with the driving mechanism, and thereby rotated in synchronism with the shaft and the blank held thereon, and a cam follower with connecting means for tilting the cradle on its axis as the blank is turned by the shaft.

26. In a machine for operating on a work piece to give a desired shape and having a support and a driven tool on the support, the improvement comprising a blank feeding mechanism having a frame mounted for reciprocation on the support, a cradle pivotally supported in the frame, a shaft journalled in the cradle along an axis normal to the pivot of the cradle, a clamp on the end of the shaft constructed and adapted to hold a blank to the shaft, driving mechanism for the shaft, rotating cams connected to said driving mechanism, and thereby driven in synchronism with the said shaft and the blank held thereto, a cam follower with connecting means for tilting the cradle on the pivotal support, and a cam follower with connecting means for reciprocating the frame on the support.

27. In a machine for operating on a work piece to give a desired shape and having a support and a driven tool on the support, the improvement comprising a blank feeding mechanism having a frame mounted on the support in ways permitting reciprocatory movement of the frame in two planes normal to each other, a cradle pivotally mounted in the frame, a shaft journalled in the cradle along an axis normal to the pivot of the cradle, a clamp on the end of the shaft constructed and adapted to hold a blank to the shaft, driving mechanism for the shaft, rotating cams connected to said driving mechanism, and thereby driven in synchronism with said shaft and the blank held thereon, and cam followers with connecting means for tilting the cradle on its pivotal support, and for reciprocating the frame in its ways in the two planes as aforesaid.

28. In a machine for operating on a work piece to give a desired shape and having a support and a driven tool on the support, the improvement comprising a blank feeding mechanism having a frame mounted on the support in ways permitting reciprocatory movement of the frame in two planes normal to each other, a cradle pivotally supported in the frame, a shaft journalled in the cradle along an axis normal to the pivot of the cradle, a clamp on the end of the shaft constructed and adapted to hold a blank to the shaft, driving mechanism for the shaft, a cam shaft connected to said driving means, and thereby driven in synchronism with the first mentioned shaft and the blank held thereon, and means controlled by cams on the cam shaft for tilting the cradle on its pivotal support, and for reciprocating the frame in its ways in the two planes as aforesaid.

29. In a machine for operating on a work piece to give a desired shape and having a support and a driven tool movably positioned on the support, the improvement comprising a blank feeding mechanism having a frame mounted for reciprocation on the support, a cradle pivotally mounted in the frame, a shaft journalled in the cradle along an axis normal to the pivot of the cradle, a clamp on the end of the shaft constructed and adapted to hold a blank to the shaft, driving mechanism for the shaft, rotating cams connected to said driving mechanism, and thereby driven in synchronism with the said shaft and the blank held thereto, and cam followers with connecting means for tilting the cradle on its pivot, for reciprocating the blank feeding mechanism on its support, and for moving the position of the tool on the support.

JUSTIN P. QUIRK.
LUDWIG G. P. HAFNER.

REFERENCES CITED

The following references are of record in the file of this patent:

UNITED STATES PATENTS

| Number | Name | Date |
| --- | --- | --- |
| 281,691 | Henderson | July 24, 1883 |
| 1,409,565 | Munson | Mar. 14, 1922 |
| 1,488,534 | Folson | Apr. 1, 1926 |
| 1,595,975 | Hauck | Aug. 10, 1926 |
| 1,694,465 | Clausing | Dec. 11, 1928 |
| 1,753,425 | MacDonald | Apr. 8, 1930 |
| 1,775,910 | Muzzey | Sept. 16, 1930 |
| 2,038,534 | Bray | Apr. 28, 1936 |
| 2,062,416 | Howard | Dec. 1, 1936 |
| 2,076,123 | Gialdini | Apr. 6, 1937 |
| 2,151,875 | Sosa | Mar. 28, 1939 |